US006680268B2

(12) United States Patent
Alford et al.

(10) Patent No.: US 6,680,268 B2
(45) Date of Patent: Jan. 20, 2004

(54) SINTERED MATERIALS

(75) Inventors: Neil M. Alford, London (GB); Stuart J. Penn, Wickford (GB)

(73) Assignee: South Bank University Enterprises Limited, London (GB)

( * ) Notice: Subject to any disclaimer, the term of this patent is extended or adjusted under 35 U.S.C. 154(b) by 0 days.

(21) Appl. No.: 10/217,235

(22) Filed: Aug. 12, 2002

(65) Prior Publication Data

US 2003/0013597 A1 Jan. 16, 2003

Related U.S. Application Data

(63) Continuation of application No. 09/587,726, filed on Jun. 5, 2000, now abandoned, which is a continuation-in-part of application No. 09/117,066, filed as application No. PCT/GB96/03152 on Dec. 19, 1996, now abandoned.

(30) Foreign Application Priority Data

Dec. 22, 1995 (GB) .............................. 9526343

(51) Int. Cl.$^7$ ................................ C04B 35/10
(52) U.S. Cl. ...................... 501/127; 501/153
(58) Field of Search ................. 501/127, 153

(56) References Cited

U.S. PATENT DOCUMENTS 3,637,406 A * 1/1972 Bailey ........................ 501/152

FOREIGN PATENT DOCUMENTS

EP 678489 * 4/1994

* cited by examiner

Primary Examiner—C. Melissa Koslow
(74) Attorney, Agent, or Firm—Bartlett & Sherer; Ronald B. Sherer

(57) ABSTRACT

Sintered alumina of Q value of greater than 25,000 and up to and greater than 45,000 at 10 GHz and at 25° C., useful in useful in dielectric resonators can be obtained by sintering alumina powders with low level of impurities at between 1500° C. and 1600° C. until a density of at least 98% of its theoretical value is obtained.

3 Claims, No Drawings

SINTERED MATERIALS

RELATED APPLICATIONS

This application is a Continuation of application Ser. No. 09/587,726, now abandoned, filed Jun. 5, 2000 which was a Continuation-In-Part of application Ser. No. 09/117,066, now abandoned, filed Jul. 15, 1998 which was a Section 371 Application of PCT/GB96/03152, filed Dec. 19, 1996, based upon U.K. Application No. 9526343.0 having a Priority Date of Dec. 22, 1995.

FIELD OF THE INVENTION

This invention relates to the production of low dielectric loss ceramic materials, particularly ceramic materials useful in dielectric resonators. In current microwave communication, technology dielectric resonators (DRs) are key elements for filters, low phase noise oscillators and frequency standards. DRs possess resonator quality factors (Q) comparable to cavity resonators, strong linearity at high power levels, weak temperature coefficients, high mechanical stability and small size.

BACKGROUND OF THE INVENTION

Ceramic dielectric materials are used to form thermally stable DRs as key components in a number of microwave subsystems which are used in a range of consumer and commercial market products. These products range from Satellite TV receiver modules (frequency converter for Low Noise Broadcast (LNB)); Cellular Telephones, PCN's. (Personal Communication Networks Systems) and VSAT (Very Small Aperture Satellite) systems for commercial application to emerging uses in transportation and automobile products, such as sensors in traffic management schemes and vehicle anti-collision devices. Dielectric Resonators may be used to determine and stabilise the frequency of a microwave oscillator or as a resonant element in a microwave filter. New systems of satellite TV transmission, based on digital encoding and compression of the video signals, determine the need for improved DR components. The availability of advanced materials will also enable necessary advances in the performance of DRs used for other purposes as referred to above.

Low dielectric loss materials are highly desirable in the area of communications over a wide frequency range. As an example, resonators using dielectric sintered ceramics may be used in base stations required for mobile communications. The materials used are often complex mixtures of elements.

One of the earliest resonator materials was Barium Titanate ($BaTiO_3$ or $BaTi_4O_9$ see, for example, T Negas et al American Ceramic Society Bulletin, vol. 72, pp 88–89 1993). The dielectric loss of a material is referred to as the tan delta and the inverse of this quantity is called the Q (Quality Factor). The Q factor of a resonator is determined by choosing a resonance and then dividing the resonant frequency by the band width 3 dB below the peak.

The losses in ceramic materials may be associated with molecules or defects which can be spatially oriented (Debye loss), due to the inertia of free charges, e.g. electrons in a metal or resonant absorption at certain frequencies. It is considered that extrinsic factors such as impurities and e.g. oxygen vacancy concentration as well as microstructure are of overriding importance. Single crystals or 'perfect' crystals have a massively lower loss when corresponding polycrystalline materials. The difference between a 'perfect' single crystal and a polycrystalline ceramic are thought to be due to the huge differences in microstructure and perfection between the two and are clear indicators why it is considered impossible to achieve a dielectric loss approaching that of single crystal counterparts in sintered materials.

The particulate ceramic material can be shaped in a variety of ways, for example, by uniaxial powder pressing, by isostatic pressing, by slip-casting or by polymer processing and extrusion. The resultant shape is then sintered at high temperature and this is associated with a shrinkage and a decrease in the volume of the body. In the prior art, the sintering step can take place in air or in special atmospheres be they oxidising, reducing or inert.

Sintering a ceramic involves taking a fine powder of the material, pressing it into the desired shape and then heating it to temperatures less than their melting point (usually about 75% of the melting point). The powders sinter together in an effort to reduce surface energy and this is accomplished by the reduction in surface area until the porosity is reduced substantially or entirely. The sintering process involves less expensive capital equipment and is less energy intensive than for forming single crystals.

A single crystal is made from a melt and the melting temperature of alumina is 2072° C.

The major problem with dielectric ceramics is that their dielectric loss is much higher than single crystals. Single crystal materials can exhibit very low loss and this is usually attributed to the absence of grain boundaries and the greater perfection in their structure.

The problem with single crystals is that they are time consuming to manufacture and they are extremely expensive. For example, a single crystal of alumina in cylindrical form is around 10,000 times more expensive than an identically shaped sintered alumina.

A material which has been used for DRs is sintered alumina and this has been found to have a Q factor very much less than a single crystal.

In order to obtain dense alumina ceramics it can be necessary to add binders such as polyvinyl alcohol or microcrytalline wax to the powders or to treat the alumina powder before sintering, however the addition of the binder or the pre-treatments used have reduced the Q value to too low a value.

U.S. Pat. No. 3,637,406 discloses alumina of fine grained structure, however the alumina structure disclosed in this patent incorporate organic binders such as polyvinyl alcohol which adversely affect the Q value so that the Q value is reduced.

EP 0678489 discloses a high hardness alumina product, the alumina structures disclosed in this patent are obtained by sintering alumina powders, but the ceramics disclosed are formed by the addition of a binder or pre-treating the alumina powder with nitric acid.

SUMMARY OF THE INVENTION

A primary object of the invention is to provide an alumina with useful for making DRs with a lower dielectric loss.

This object can be obtained by means of a sintered alumina having a Q value greater than 30,000 at 9–10 GHz and at 25° C.

Preferably the alumina has a porosity less than 2% (density greater than 98% of the theoretical value), and more preferably less than 1% (density greater than 99% of the theoretical value).

Preferably the temperature of sintering for powders such us alumina is less than 1600° C. And more preferably between 1500° C. and 1600° C.

The sintered alumina of the present invention can be made in any conventional way, e.g. by pressing the powdered alumina into a shape and then heating to a temperature below its melting point. The powders sinter together until the porosity is substantially reduced. Preferably the sintering takes place in all atmosphere of air with a partial pressure of oxygen or in oxygen e.g. not in a reducing atmosphere.

Preferably the alumina powder has a particle size of less than 3 microns and more preferably of 0.01 to 2 microns.

The dielectric loss of poly-crystalline sintered alumina has been measured by several workers and the results vary widely. For example, Ceramic Source, vol. 6 1990, American Ceramic Society (publ) reports the loss of alumina as Q=1000 at 10 GHz and 25° C.

The highest Q previously measured in alumina at room temperature (i.e. approximately 25° C.) is by Woode et al (R A Woode, E N Ivanov, M E Tobar and D G Blair 'Measurement of dielectric loss tangent of alumina at microwave frequencies and room temperature' Electronics Letters, vol, 30 no. 25, Dec. 8, 1994) who measured a Q of 23,256. This Article noted that purity alone was a poor indicator of the dielectric loss tangent. We have found that although an impure alumina will give a poor Q, a very pure alumina is not a guarantee of a high Q. Pure alumina can have compounds added to it in order to assist the sintering process. These additions should not adversely influence the Q. So, for example, magnesia may be added to a very pure alumina and this will assist the sintering but will not adversely affect the Q if added in small quantities. However, adverse effects are observed with impurities such as alkali salts (sodium and potassium) and metallic elemental impurities such as iron.

It is surprising that the present invention can produce sintered alumina with a Q value greater than 30,000.

DETAILED DESCRIPTION OF THE INVENTION

The invention is described in detail the following Examples.

The alumina used were commercially available alumina containing the impurities set out in Table 1 below, the numbers are parts per million of the total weight of the sample.

TABLE I

Chemical analyses of powders used

|  | A | B | C | D | E | F | G | H |
|---|---|---|---|---|---|---|---|---|
| $Na_2O$ | 800 | 300 | 600 | 4000 | 4000 | 20 | 6 | 100 |
| MgO | 400 | 1000 | 1800 | na |  | 16 | 5 | 8 |
| $SiO_2$ | 400 | 400 | 400 | 300 | 300 | 85 | 18 | 85 |
| $Fe_2O_3$ | 300 | 100 | 200 | 200 | 200 | 29 | 11 | 35 |
| CaO | 200 | 40 | 300 | 300 | 200 |  |  | 15 |
| $SO_3$ |  |  |  | 100 |  |  |  |  |
| CuO |  |  |  |  |  | 13 | 4 | 3 |
| Surface area $m^2g^{-1}$ | 7 | 5 | 3 | 0.7 | 0.9 | 5–10 | 9–16 | 30 |
| Sample % Density | 97.8 | 98.2 | 79.2 | 53.6 | 59.7 | 98 | 99 | 100 |

EXAMPLES

Powders A–C inclusive were pressed in a 13.5 mm diameter stainless steel die press at a pressure of 100 MPa. The pressed samples were sintered in air at a temperature of 1550° C. for 300 mins. To a density of greater than 98% theoretical. The sample density was then measured and the dielectric constant and dielectric loss experiments were carried out using a parallel plate resonator and employing a modified Haaki-Coleman technique described in B. W Haki and P. D Coleman 'A dielectric resonator method of measuring inductive capacities in the millimetre range', IFEE Trans. Microwave Theory Tech. Vol. 8, p.402–410 (1960). Here the dielectric puck is placed not directly onto the lower copper plate but onto a low loss material with a much lower dielectric constant. We have used a quartz crystal 4 mm thick and 10 mm in diameter. The sample dimensions were approximately 10 mm diameter, 4 mm thick discs. The measurements were made using a Hewlett Packard HP8719C vector network analyzer with 1 Hz resolution and the TE011 mode was examined. All dielectric measurements were carried out at room temperature in air at a relative humidity of approximately 30%. No special precautions were taken to prevent the adsorption of water to the sample surface. The loss measurements are presented in terms of the Q factor, i.e. tan delta$^{-1}$, the measuring frequency was 9–10 GHz at a temperature of 25° C.

In all the examples 1 to 7 and 9 no binder was added.

Example 1

Sample A showed a Q of 3,500 whilst B and C had Q factors of less than 1000. Sample C achieved a poor density and this in addition to impurity levels is responsible for low Q.

|  | A | B | C |
|---|---|---|---|
| Q | 3500 | <100 | <1000 |

Samples A, B and C had a mean particle size of 0.01 to 2 microns.

Example 2

Two alumina (D and E) with lower surface area and a mean particle size of approximately 5 micrometers were processed in a manner identical to Example 1. The major difference was the sample density. The dielectric loss was found to be far higher than the denser samples indicating clearly that both purity and sample density affect the Q value.

|  | D | E |
|---|---|---|
| Q | <1000 | <1000 |

Example 3

Two chemically pure powders (F and G) of, mean particle size less than 3 microns were processed as in Example 1 and into dense discs. The Q of these materials were found to be higher than the previous samples. Sample F2, although made from the same material, was subjected to a higher sintering temperature of 1600° for 300 mins. This caused a decrease in Q. This indicates a very narrow preferred processing window is available for the production of high Q material.

|   | F1 | F2 | G |
|---|---|---|---|
| Q | 35000 | 12000 | 35000 |

Example 4

In order to elucidate the effect of porosity on the Q value, the chemically pure alumina (alumina F) was processed as in Example 1 except that it was sintered at varying temperatures. This had the effect of varying the porosity in the samples. In the table below the percentage density is noted after the letter F.

|   | F-61.4% | F-84.6% | F-96% | F-98% | F-99% |
|---|---|---|---|---|---|
| QND | 400 | 12000 | 16000 | 35000 | |

Example 5

A relatively pure alumina (H) was processed in different manner. In this case the samples were pressed as in Example 1 but sintered in hydrogen at a temperature of 1500° C. to a density of 98.5%. The resulting disc was translucent and the grain size was approximately 30 micrometers. When the Q of this material was measured it was found to be 8,000 demonstrating the importance of avoiding a reducing atmosphere in the sintering process.

|   | H |
|---|---|
| Q | 8000 |

Example 6

By way of comparison three single crystals (SC1–3) of sapphire $Al_2O_3$ were tested under identical conditions. As expected the Q of the single crystals was higher than the Q of the sintered alumina but surprisingly the Q factors for the preferred sintered alumina of the invention was only a factor of two lower.

|   | SC1 | SC2 | SC3 |
|---|---|---|---|
| Q | 100,000 | 100,000 | 100,000 |

Example 7

Surprisingly it was found that as the grain size of the alumina increased the Q deteriorated. This is believed to be the explanation for the decrease in Q in sample F2 in Example 3. To explore this more fully a series of experiments were undertaken using powder F it is well known in the art that grain boundaries are a source of loss. A reasonable approach might therefore be to reduce the number of grain boundaries by producing a sintered material with large grains. We have found that as the grain size increases above 3 micrometers as determined by the linear intercept method (I G Crossland and B D Clay "Diffusion creep and its inhibition in stainless steel" Acta. Metall volume 25 page 929 (1977)) the Q value decreases.

The grain size of alumina F was grown by allowing the sample to sinter for longer times at 1600° C. And the result shown below.

| Grain size (micrometers) | Q |
|---|---|
| 2.33 | 45,849 |
| 2.59 | 34,072 |
| 4.55 | 17,101 |
| 6.39 | 10,299 |

Example 8

By way of comparison alumina F of example 3 was prepared as F1 in example 3 with the addition of polyvinyl alcohol binder in an amount of 3% weight of the total composition, the sample was sintered to a density of 98.74% and the Q factor was measured at 23° C. and 9.287 GHz and found to be 29,000. The sintered ceramic was fine grained and the size was approximately 0.8 to 1.2 microns.

Example 9

By way of comparison a ceramic of alumina F was prepared by mixing with distilled water to which was added nitric acid to a pH 5. The suspension was dispersed using a stirring mechanism and simultaneous ultrasonic dispersion. The suspension was seived and pressed to a disc 13.5 mm which was dried in stages between 20 and 110° C. The discs were pressurelessly sintered in air at 1275° C. to a density of 99.0% find the Q value at 25° C. and 9 GHz measured and found to be 11,800.

What is claimed is:

1. A sintered alumina having a Q value greater than 30,000 at 9–10 GHz and 25° C., a porosity of less than 2%, which contains 163 to 44 parts per million by weight of the total composition of impurities including 16 to 5 ppm of MgO and in which the mean grain size of the alumina is less than 3 micrometers and contains no binder.

2. The sintered alumina of claim 2 wherein said grain size is 2 or less micrometers.

3. A method of making a sintered alumina having a Q value of 30,000 or greater at 9–10 GHz and 25° C. which comprises sintering an alumina powder having a particle size of three or less micrometers, without a binder in a non-reducing atmosphere where the powder contains in the order of 163 to 44 parts per million by weight of the total composition of impurities, at between 1500° C. and 1600° C. until a density of greater than 98% of its theoretical value is achieved.

* * * * *